(12) United States Patent
Yamamoto et al.

(10) Patent No.: US 8,184,724 B2
(45) Date of Patent: May 22, 2012

(54) WIRELESS COMMUNICATION SYSTEM AND WIRELESS COMMUNICATION METHOD

(75) Inventors: Keisuke Yamamoto, Kokubunji (JP); Masaaki Shida, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/133,398

(22) PCT Filed: Dec. 9, 2008

(86) PCT No.: PCT/JP2008/072320
§ 371 (c)(1),
(2), (4) Date: Jun. 8, 2011

(87) PCT Pub. No.: WO2010/067419
PCT Pub. Date: Jun. 17, 2010

(65) Prior Publication Data
US 2011/0243203 A1  Oct. 6, 2011

(51) Int. Cl.
*H04L 27/00* (2006.01)
*H04B 7/00* (2006.01)
*H04B 1/40* (2006.01)

(52) U.S. Cl. .............. 375/259; 455/69; 455/88

(58) Field of Classification Search .......... 375/141, 375/219, 220, 222, 225, 227, 260, 267, 221, 375/259; 370/208, 310, 342, 343; 455/24, 455/500, 509, 513, 62, 67.13, 69, 88, 553.1
See application file for complete search history.

(56) References Cited

U.S. PATENT DOCUMENTS

| | | | | |
|---|---|---|---|---|
| 2004/0190636 A1* | 9/2004 | Oprea | ............ | 375/260 |
| 2007/0133708 A1* | 6/2007 | Lee et al. | ............ | 375/267 |
| 2008/0165877 A1* | 7/2008 | Guo et al. | ............ | 375/262 |
| 2008/0192683 A1* | 8/2008 | Han et al. | ............ | 370/329 |
| 2008/0310523 A1* | 12/2008 | Hui et al. | ............ | 375/260 |
| 2010/0202553 A1* | 8/2010 | Kotecha et al. | ............ | 375/267 |

FOREIGN PATENT DOCUMENTS

| JP | 2006-238215 A | 9/2006 |
|---|---|---|
| JP | 2007-36403 A | 2/2007 |

OTHER PUBLICATIONS

Gerard J. Foschini, "Layered Space-Time Architecture for Wireless Communication in a Fading Environment When Using Multi-Element Antennas", Bell Labs Tech Journal, Autumn 1996, pp. 41-59.
Andre Bourdoux, et al., "Joint TX-X Optimisation for MIMO-SDMA Based on a Null-space Constraint", VTC, IEEE 56th, Fall-2002, pp. 171-174. Takahiko Tsutsumi, et al., "A Study on Weight Compensation for Time-Variant Channel in E-SDM", The Institute of Electronics, Information and Communication Engineers, Sogo Taikai Koen Ronbunshu, Communication 1-B-5-317, Mar. 19-22, 2003.
International Search Report including English translation dated Jan. 13, 2009 (Four (4) pages) for corresponding international application No. PCT/JP2008/072320.
PCT/ISA/237 Form (Three (3) pages) dated Jan. 13, 2009 for corresponding international application No. PCT/JP2008/072320.

* cited by examiner

*Primary Examiner* — Young T. Tse
(74) *Attorney, Agent, or Firm* — Crowell & Moring LLP

(57) ABSTRACT

In a wireless communication system in which a sending side derives transmit weight vectors based on feedback information and carries out precoding, performance degradation is caused when the channel at the time when the transmit weight vectors are derived and the true channel are different from each other. Along with variations in the channel, the power allocation to a plurality of effective streams formed in MIMO is caused to approach asymptotically to uniform power allocation from the value determined based on the channel state information that the sending side has.

14 Claims, 13 Drawing Sheets

WIRELESS COMMUNICATION SYSTEM AND WIRELESS COMMUNICATION METHOD

TECHNICAL FIELD

The present invention relates to a wireless communication system and a wireless communication method, and more particularly relates to a wireless communication system and a wireless communication method in which a sending side derives transmit weight vectors based on feedback information and carries out precoding.

BACKGROUND ART

Conventionally, there have been MIMO (Multiple-Input Multiple-Output) technologies (see, for example, Non-Patent Document 1).

Conventionally, there have also been technologies in which sending-side precoding is carried out by MIMO (see, for example, Non-Patent Document 2).

Non-Patent Document 1: G. J. Foschini, Bell Labs Tech. J, pp. 41-59, Autumn (1996)

Non-Patent Document 2: Andre Bourdoux, Nadia Khaled, VTC 2002-Fall. IEEE 56th pp. 171-174, 1 (2002)

SUMMARY OF THE INVENTION

Problems to be Solved by the Invention

Recently, practical realization of a wireless communication system using MIMO (Multiple-Input Multiple-Output) has been promoted. Moreover, as the MIMO technology for further improving spectral efficiency and improving the spectral efficiency of an entire system in a multiuser environment, transmit precoding and transmit beam-forming in which channel state information (CSI) is obtained on a sending side and appropriate signal processing in accordance with the channel is carried out on the sending side have attracted attention. For example, the MIMO technology is disclosed in Non-Patent Document 1, and the technology for carrying out the sending-side precoding is disclosed in Non-Patent Document 2.

In a wireless communication system using the MIMO technology, as a matter of course, the spectral efficiency can be more improved in the case where the sending side has the information about a channel than in the case where the sending side does not have the information about the channel. This improvement can be realized when appropriate signal processing specialized for the channel is carried out by the sending side based on the obtained channel state information.

However, in order that the sending side obtains the channel state information in the wireless communication system, the sending side and the receiving side have to form a feedback loop to transmit/receive the CSI, but since the communication of the feedback information is an overhead for the system, the system has to be formed in consideration of the balance between the feedback information volume/frequency and the effects achieved when the sending side has the channel state information.

Furthermore, the method in which the transmit weight vectors specialized for the channel are derived based on the channel state information obtained by the sending side to carry out the precoding is effective means for improving communication performance. However, mismatches between the channel at the time when the transmit weight vectors are derived and the channel in actual communication, cause performance degradation. Therefore, in order to achieve the stability of the communication system and the improvement in the effective spectral efficiency, this degradation has to be suppressed. For example, in the case where the channel is changed momentarily from the time when the weight vectors are derived, the difference between the channel at the time when the weight vectors are derived and the true channel is increased as time elapses. As a method for avoiding the degradation caused by this, for example, a method of predicting the change in the channel and a method of increasing the frequency of feedback are conceivable. However, increasing the frequency of the feedback leads to reduction in the effective throughput of the system. Also, the method of predicting the change in the channel may not be appropriate depending on applications in terms of implementation difficulty, prediction accuracy and others.

The present invention has been accomplished in view of the foregoing problems, and an object of the present invention is to suppress the performance degradation in the case where the channel at the time when weight vectors are derived and the channel at the time of communication are different from each other in a wireless communication system in which a sending side and a receiving side form a feedback loop and the sending side derives the transmit weight vectors based on feedback information and carries out precoding.

Means for Solving the Problems

One of the typical examples of the present invention will be shown as follows. That is, a wireless communication system according to the present invention is a wireless communication system in which at least one sending-side wireless transceiver and at least one receiving-side wireless transceiver form a feedback loop and carry out communication with each other, and it is characterized in that the sending-side wireless transceiver has a function of deriving transmit weight vectors including optimum power allocation for a channel based on feedback of channel state information from the receiving-side wireless transceiver, carrying out the communication by using the weight vectors, and estimating difference between the channel at the time when the transmit weight vectors are derived and an actual channel, and as the difference between the channel at the time when the transmit weight vectors are derived and the actual channel increases, the power allocation is caused to approach asymptotically to equal allocation from a value at the time when the transmit weight vectors are derived.

Also, a wireless communication method according to the present invention is a wireless communication method using a wireless communication system in which at least one sending-side wireless transceiver and at least one receiving-side wireless transceiver form a feedback loop and carry out communication with each other, and the method includes: a step of deriving transmit weight vectors including optimum power allocation for a channel by the sending-side wireless transceiver based on feedback of channel state information from the receiving-side wireless transceiver; a step of carrying out the communication mutually between the sending-side wireless transceiver and the receiving-side wireless transceiver using the transmit weight vectors; a step of estimating difference between the channel at the time when the transmit weight vectors are derived and an actual channel; and a step of causing the power allocation to approach asymptotically to equal allocation from a value at the time when the transmit weight vectors are derived as the difference between the channel at the time when the transmit weight vectors are derived and the actual channel increases.

Effects of the Invention

According to the present invention, in a wireless communication system in which the sending side derives transmit weight vectors based on feedback information and carries out precoding, it is possible to suppress the performance degradation in the communication in the case where the channel at the time when weight vectors are derived and the true channel are different from each other.

DESCRIPTION OF REFERENCE NUMERALS 101-103: wireless transceiver, 201: wireless transceiver (sending side), 202: wireless transceiver (receiving side), 301: transceiver, 302: transmitting and receiving antenna, 303: analog front end, 304: digital signal processing unit, 305: transmitting and receiving data control unit, 401: digital signal processing unit, 402: transmitting signal generating unit, 403: transmit weight vector generating unit, 404: synchronization detecting unit, 405: channel estimating and equalizing unit, and 406: decoding unit.

BEST MODE FOR CARRYING OUT THE INVENTION

Precoding on a sending side can be divided into an operation of separating a channel into a plurality of effective streams and an operation of allocating appropriate power to the plurality of effective streams. The state thereof is shown by [Expression 1].

$$X = W_{tx} \cdot P \cdot S \qquad \text{[Expression 1]}$$

In [Expression 1], X represents a transmitting signal after the precoding, S represents the signals allocated to the streams formed after the precoding, P represents a matrix for allocating power to the streams, and $W_{tx}$ represents transmit weight vectors not including power allocation. In the case where the precoding is not carried out, the transmitting signal X is equal to S. Also, the case where the channel after precoding becomes a single stream corresponds to the case where all the power is allocated to only one stream in the power allocation.

The present invention is a wireless communication system in which at least one wireless transceiver of a sending side forms a feedback loop with at least one wireless transceiver of a receiving side to carry out communication, wherein the wireless transceiver has a function of estimating a state of a channel, a function of feeding back the estimated channel state information and a function of generating transmit weight vectors from the fed-back channel state information; the wireless transceiver has a function of estimating a gap between the channel at the time when transmit weight vectors are derived and a true channel; and power allocation determined at the time when weight vectors are derived is caused to approach asymptotically to the uniform power allocation among all the streams in accordance with the degree of the estimated gap between the channel at the time when transmit weight vectors are derived and the true channel.

Hereinafter, an embodiment of the present invention will be described in detail with reference to drawings.

Figure 1:
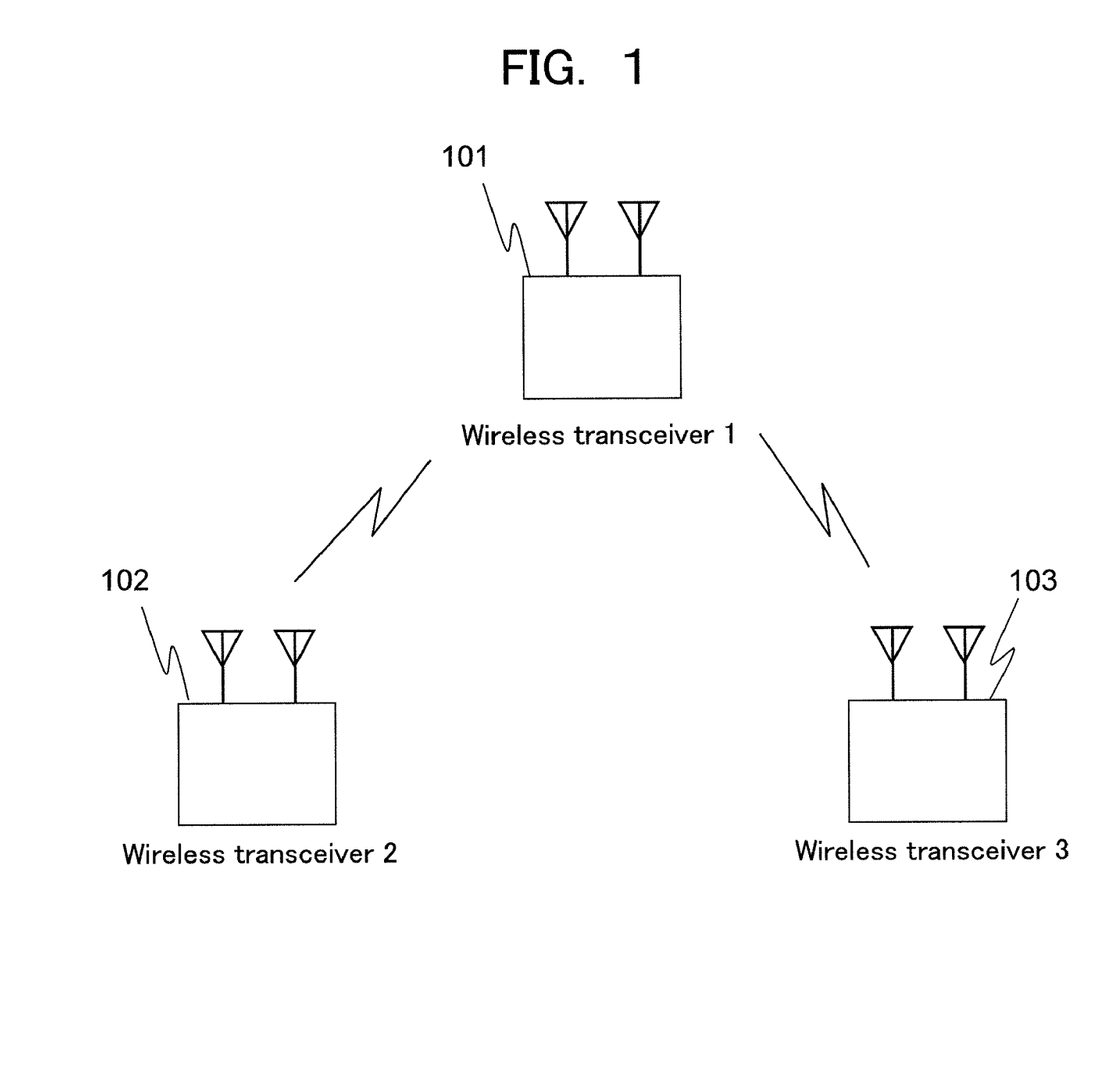
FIG. 1 is a drawing showing the outline of a wireless communication system according to the present invention and is a drawing showing the wireless communication system in which a feedback loop is formed to carry out communication.

FIG. 1 is a drawing showing the outline of a wireless communication system according to the present invention. In FIG. 1, a wireless transceiver 1 is provided with a plurality of antennas, and each of wireless transceivers 2 and 3 is provided with at least one antenna. The wireless transceiver 1 has a function of improving the communication performance with respect to at least one of the wireless transceivers by using a transmit weight vector derived based on feedback information from the receiving side when sending data.

Figure 2:
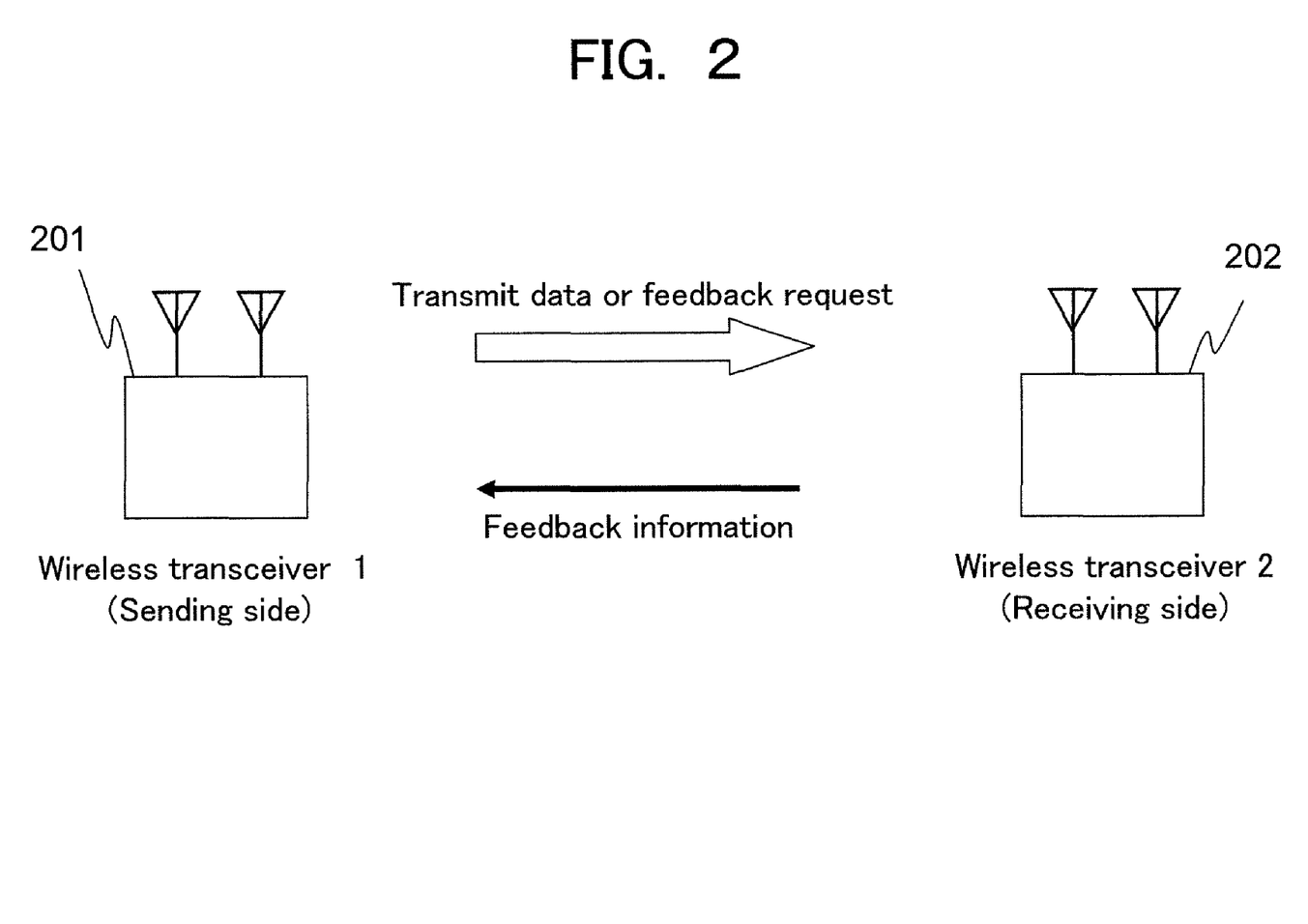
FIG. 2 is a drawing showing the outline of a wireless communication system in which a feedback loop is formed to carry out communication.
Figure 3:
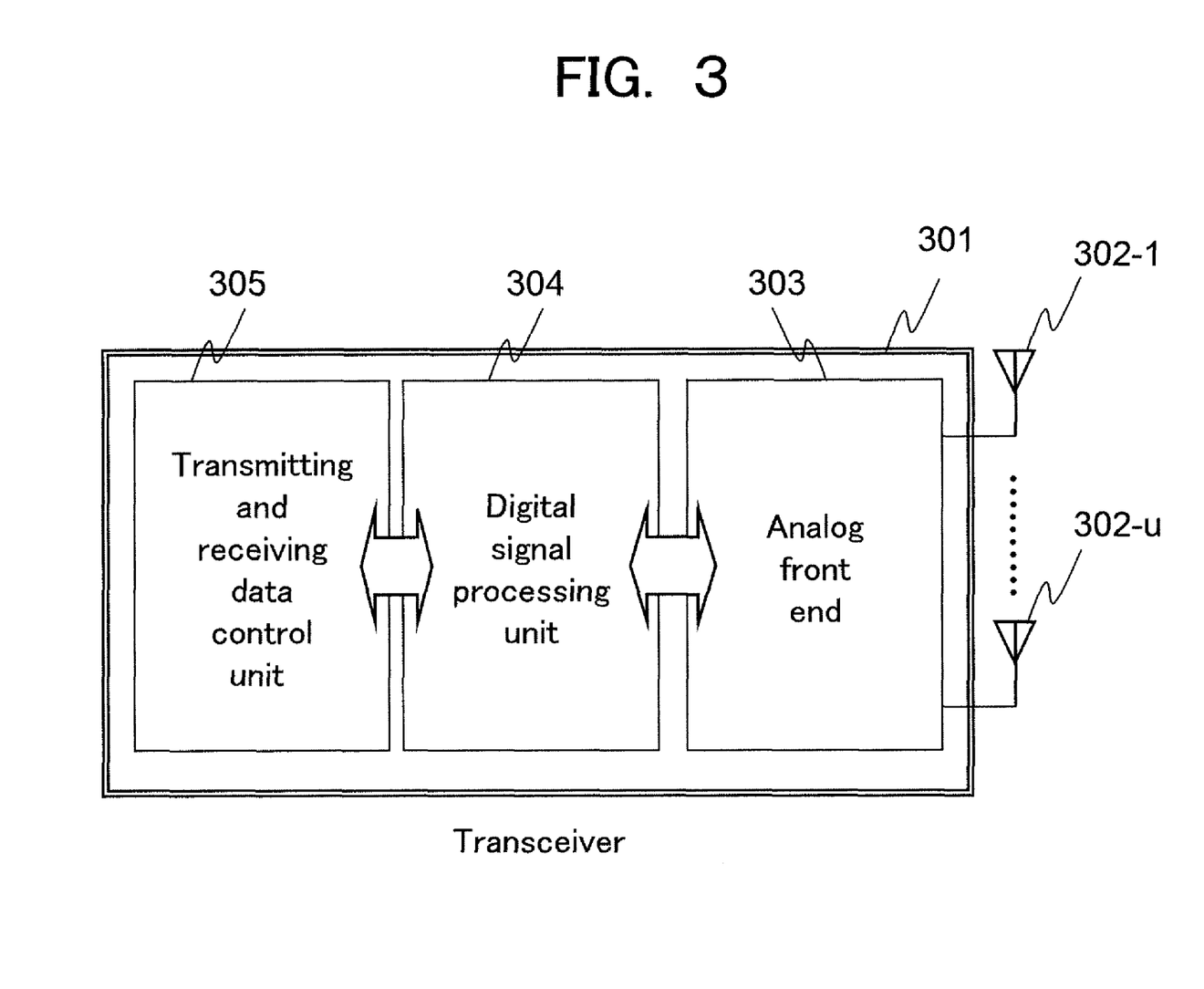
FIG. 3 is a drawing showing transceivers used in the wireless communication system in which a feedback loop is formed to carry out communication.
Figure 4:
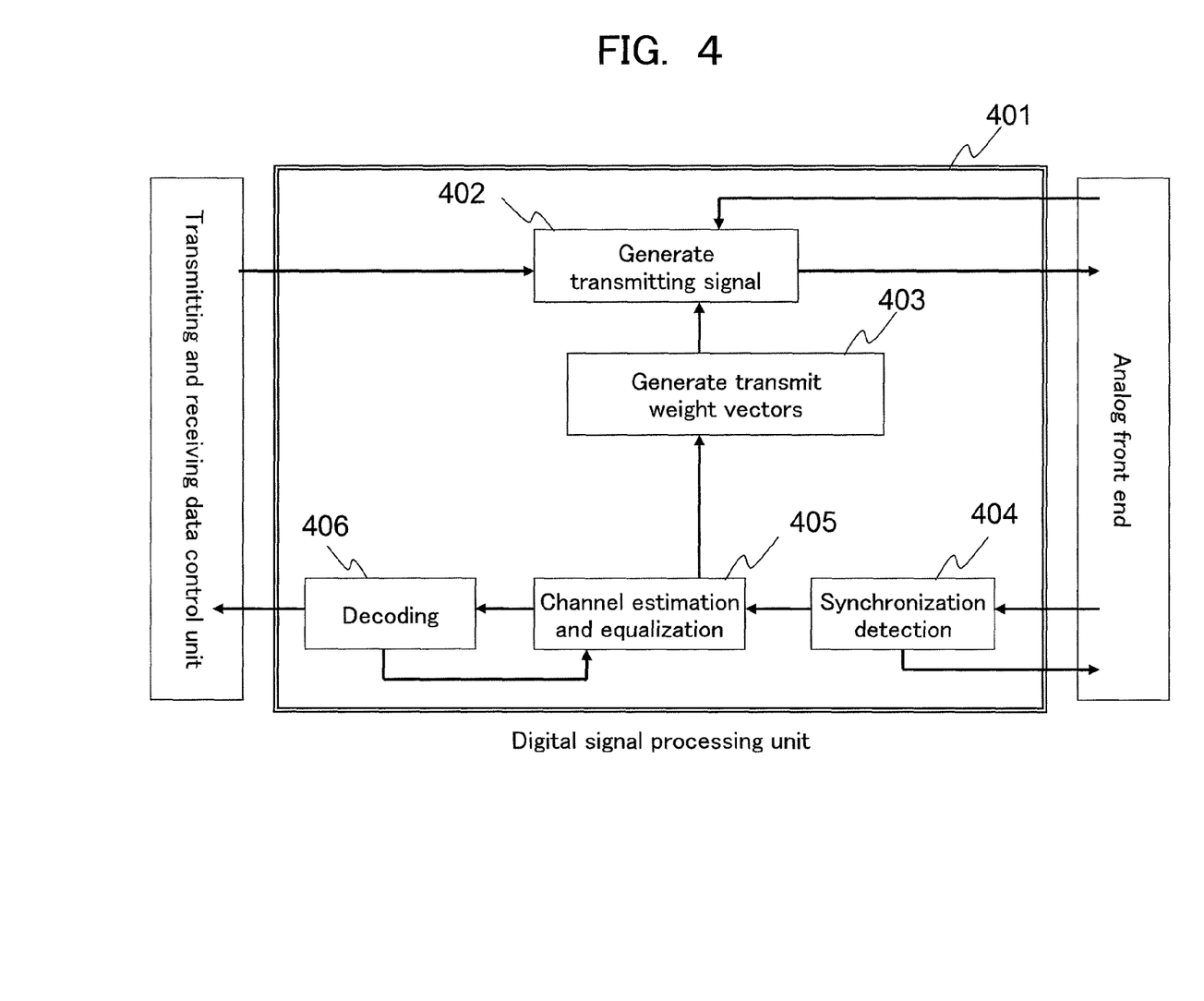
FIG. 4 is a drawing showing a digital signal processing unit used in the wireless communication system in which a feedback loop is formed to carry out communication using precoding on the sending side.
Figure 5:
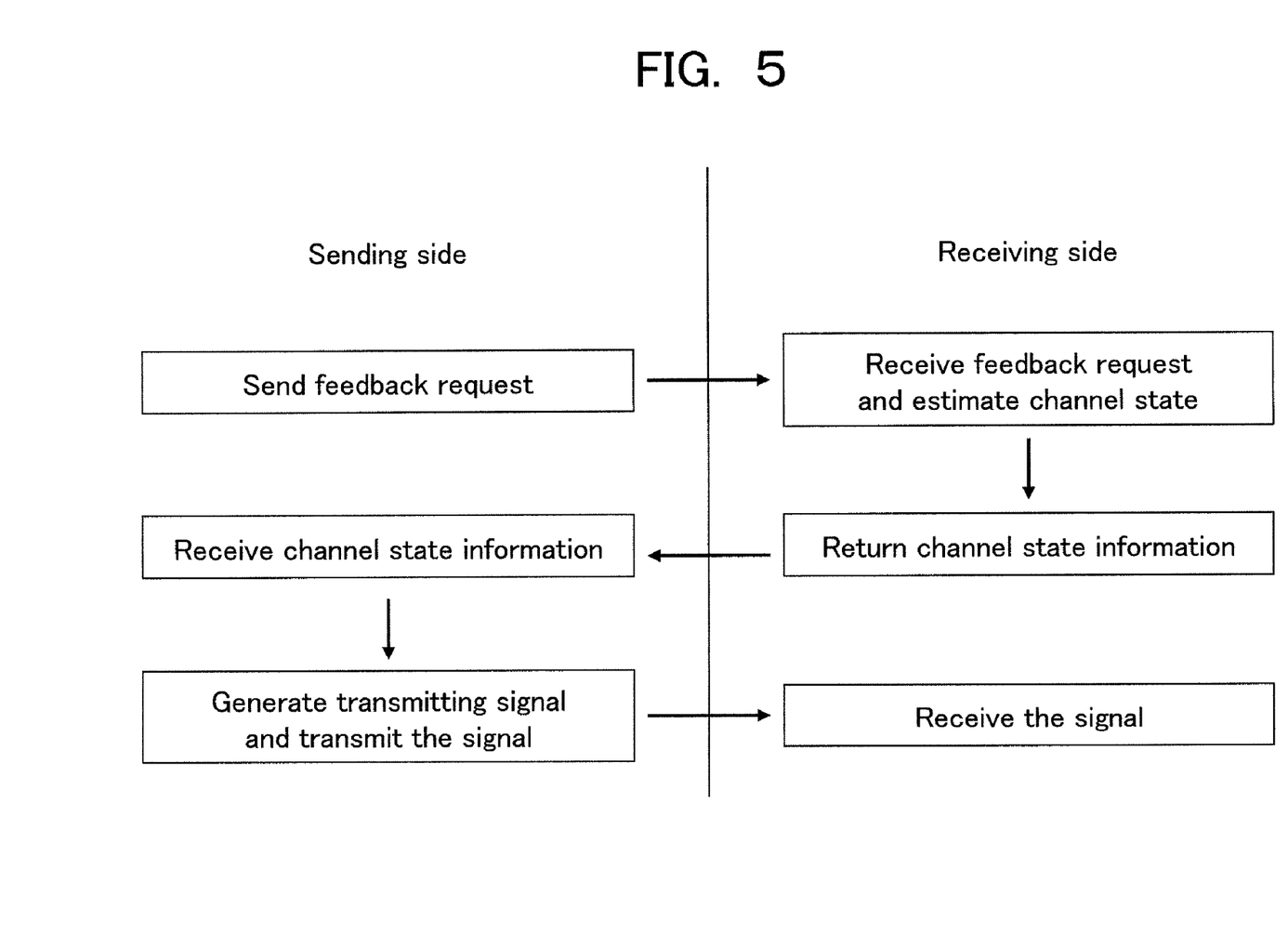
FIG. 5 is a drawing showing a time chart of data transmission/reception in the wireless communication system in which a feedback loop is formed to carry out communication.

FIG. 2 is a drawing showing the outline of the wireless communication system in which a feedback loop is formed to carry out communication. FIG. 3 shows the configuration of a transceiver 301 usable in the system of FIG. 2, with the transceiver 301 having a selected number of antennas 302-1, . . . 302-u, an analog front end 303, a digital signal processing unit 304, and a transmitting and receiving data control unit 305, and FIG. 4 shows a digital signal processing unit 401 used in the transceiver of FIG. 3, with the unit 401 having a transmitting signal generating unit 402, a transmit weight vector generating unit 403, a synchronization detecting unit 404, a channel estimating and equalizing unit 405, and a decoding unit 406. In FIG. 2, the wireless transceiver 201 of the sending side sends a feedback request, a sounding signal for channel estimation and transmit data to the wireless transceiver 202 of the receiving side. If channel state information is already known on the sending side when the data is to be sent, transmit precoding can be used based on the channel state information. The wireless transceiver of the receiving side has a function of estimating a channel and sends the obtained channel state information to the wireless transceiver of the sending side as feedback information. In the case where channel symmetry is established between sending and receiving like in time division duplex, the feedback information may be a sounding signal for estimating the channel on the sending side instead of explicit channel state information. FIG. 5 shows a procedure of sending the feedback request from the sending side and obtaining the feedback information. Note that the number of the wireless transceivers which form the feedback loop and carry out communication and the number of the antennas provided in the wireless transceivers are not limited to those of FIGS. 1 to 3.

Hereinafter, in order to describe the present invention, a specific method about the case where each of the sending side and the receiving side has two antennas and one-to-one communication is carried out will be shown.

In the method of the present invention, as shown in [Expression 1], the transmit weight vectors are divided into the matrix P for carrying out power allocation and the other part Wtx. Then, as the gap between the channel at the time of weight vector calculation and the true channel increases, the power allocation is caused to approach asymptotically to the uniform allocation among all the streams. The average power of all of the streams is Ptotal/Ns when the number of transmitting streams is Ns and the total of the transmitting power is Ptotal. When the elements of the matrix representing the power allocation are normalized by the average power, the present method corresponds to the method that causes the matrix P to approach asymptotically to a unit matrix I as the gap between the channel at the time of weight vector calculation and the true channel increases.

In the case where the sending side and the receiving side carry out one-to-one communication, the eigenmode transmission that uses the right singular vectors of a channel matrix is known as an optimum transmission method. In the eigenmode transmission, the right singular vectors are used for the transmit weight vectors not including power allocation, and power allocation is carried out with respect to a plurality of effective orthogonalized streams to achieve an optimum channel capacity. As a power allocation method, a method using the water-filling theorem is theoretically optimum, but in the actual implementation, the least error rate algorithm or the power allocation obtained by simplifying it is used. The relations between the received signals, transmit weight vectors, channels and transmitting signals in the case where the eigenmode transmission is carried out are shown by [Expression 2].

$$Y = H \cdot V \cdot P \cdot S$$ [Expression 2]

$$\begin{bmatrix} y_1 \\ y_2 \end{bmatrix} = \begin{bmatrix} h_{11} & h_{12} \\ h_{21} & h_{22} \end{bmatrix} \cdot \begin{bmatrix} v_{11} & v_{12} \\ v_{21} & v_{22} \end{bmatrix} \cdot \begin{bmatrix} p_1 & 0 \\ 0 & p_2 \end{bmatrix} \cdot \begin{bmatrix} s_1 \\ s_2 \end{bmatrix}$$

In [Expression 2], Y represents received signals, H represents a channel matrix, V represents a matrix in which right singular vectors of the channel referenced when transmit weight vectors are derived are arranged, S represents the signals allocated to the streams formed after precoding, and P represents a matrix for allocating power to the streams.

Herein, since V corresponding to the transmit weight vectors not including power allocation is a unitary matrix, the precoding by V does not contribute to the channel capacity. However, when streams are orthogonalized on the sending side and then transmitted, there is an advantage that the processing on the receiving side is simplified. Moreover, when power allocation is carried out by P with respect to the effective channel orthogonalized by V, the channel capacity can be maximized, and communication performance can be improved. The transmit weight vectors in this case are the weight vectors specialized for the channel H' at the time when transmit weight vectors are derived, and performance degradation is caused if a gap occurs between the true channel H and H'. If the gap between H and H' increases, the performance degradation is more than the case where the sending-side precoding is not carried out. Therefore, as the gap between H and H' increases, the state is caused to gradually approach the state in which the precoding is not carried out. By this means, the worst-case degradation can be suppressed while utilizing the performance of the case where the channel state information is known on the sending side. Moreover, as described above, since the transmit weight vectors V not including power allocation are the unitary matrix, the transmit weight vectors do not intrinsically contribute to communication capacity. Therefore, when only the matrix P used for power allocation is gradually changed to a unit matrix, the characteristics can be caused to approach the characteristics of the case where the precoding is not carried out. Since the unit matrix is a kind of unitary matrices, it can be understood that the statistical characteristics of both of them are the same when the case where the precoding is not carried out is considered to be the case where the precoding is carried out with V=I and P=I.

Figure 6:
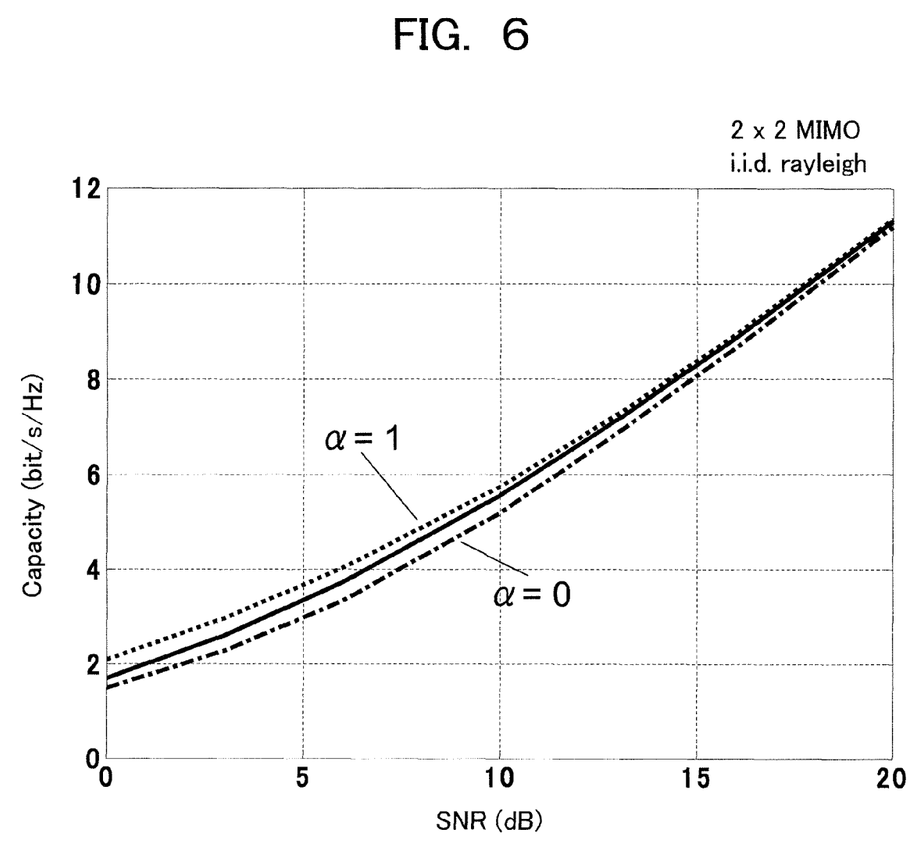
FIG. 6 is a drawing showing performance degradation in the case where the channel used for deriving the transmit weight vectors does not match the actual communicating channel in the wireless communication system in which precoding on the sending side is carried out.

FIG. 6 shows the comparison between the communication capacities in the case where the channel at the time when transmit weight vectors are derived and the true channel are different and the communication capacity in the case where precoding is not carried out. In FIG. 6, the characteristics in the case where the correlation α between the channel H' at the when transmit weight vectors are derived and the true channel H is equal to 1 are shown by a broken line, the characteristics in the case where α is equal to 0 are shown by dashed-dotted line, and the characteristics in the case where transmit precoding is not carried out are shown by a solid line. In the case where α is equal to 1, the eigenmode transmission shows ideal characteristics, and the degree of improvement from the case without precoding is large particularly in the low-SNR (Signal to noise ratio) region. On the other hand, in the case where α is equal to 0, H and H' have already become the channels which are completely irrelevant from each other, and the performance is adversely degraded by carrying out the transmit precoding. Therefore, even in the case where the true channel is largely deviated from the channel at the time when transmit weight vectors are derived, the situation in which the performance is adversely degraded by precoding can be prevented by estimating the degree of the gap between the channels and causing P to approach a unit matrix by an appropriate time constant.

Next, a method of estimating the degree of the gap from H' to the true channel H in the present invention will be described. For example, in the case where the cause of the gap between H' and H is the time variation of the channels, the degree of the gap can be estimated by using the statistical time correlation of the channels. In other words, by characterizing the time variation properties of the channels with a maximum Doppler frequency fd, the gap between H' and H can be estimated from the time t elapsed from the time when transmit weight vectors are derived.

Figure 7:
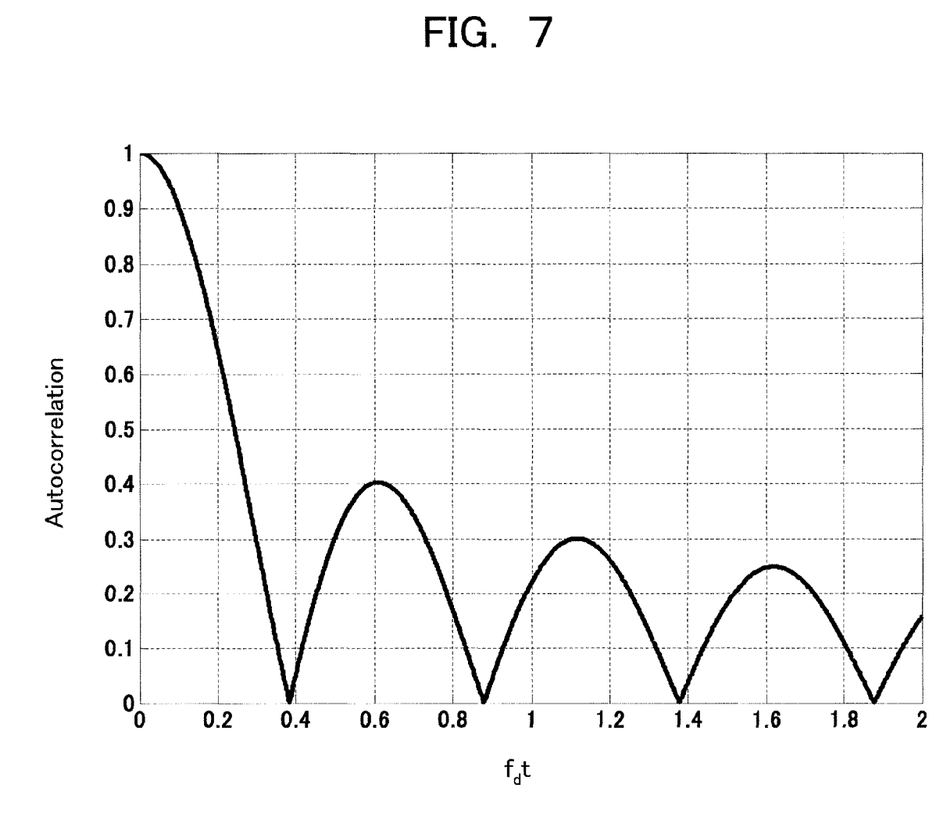
FIG. 7 is a drawing showing the change in the time autocorrelation of the channel along with time change.

For example, when the time variation properties of the channel are expressed by using the Jake's model which is often used as a Doppler profile, the variations in the channel autocorrelation caused by elapse of time become zero order Bessel function of the first kind. FIG. 7 shows the autocorrelation function of the channel in the case where the Jake's model is used.

In FIG. 7, the horizontal axis represents the normalized Doppler frequency, and the vertical axis represents the absolute value of the autocorrelation. In FIG. 7, the autocorrelation is 0 in the vicinity of fdt=0.4. For example, in the case of an application in which the maximum Doppler frequency fd is equal to 20 Hz, the channel state information used for deriving transmit weight vectors has to be updated at a frequency sufficiently faster than t=20 msec in order to maintain good performance in the transmit precoding. On the other hand, when the method of the present invention is used for this application, even when the channel state information is updated at arbitrary timing that is slower than 20 msec, the performance degradation more than that in the case without precoding can be avoided.

Next, the method of causing the power-allocating matrix P to approach asymptotically to the unit matrix used in the present invention will be described. As the method of causing the matrix P to approach asymptotically to the unit matrix I, a method in which P is caused to approach I in a certain period of time by using an appropriate function based on fd as a reference is preferable. As one of simple examples, a method in which P is caused to linearly approach I as shown by [Expression 3] is conceivable.

$$p_i(t) = \begin{cases} p_i + f_d(1-p_i)t & (f_d t \le 1) \\ 1 & (f_d t > 1) \end{cases}$$ [Expression 3]

$$\sum_{i=1}^{N} p_i = N$$

Figure 8:
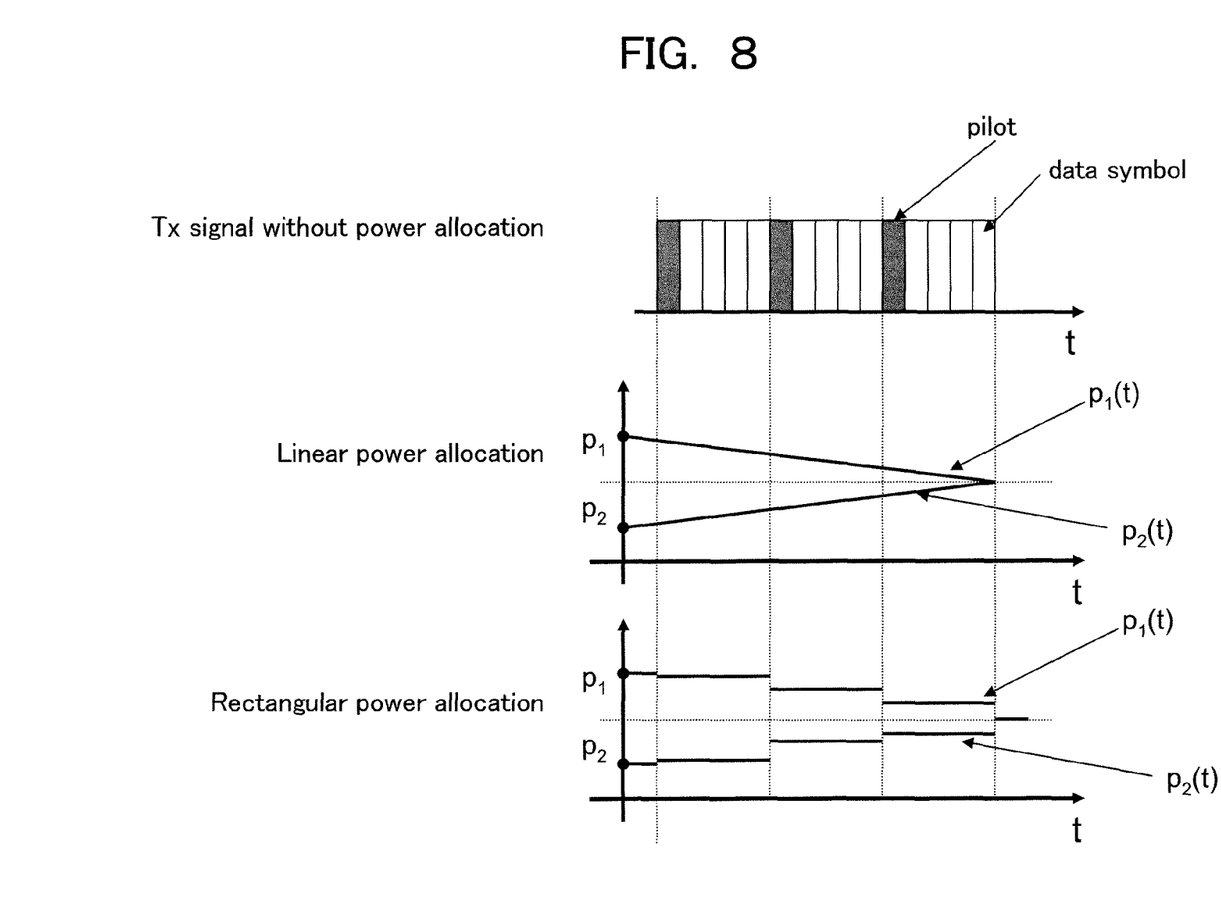
FIG. 8 is a drawing showing a method of changing the power allocation on the sending side used in the wireless communication system of the present invention.
Figure 9:
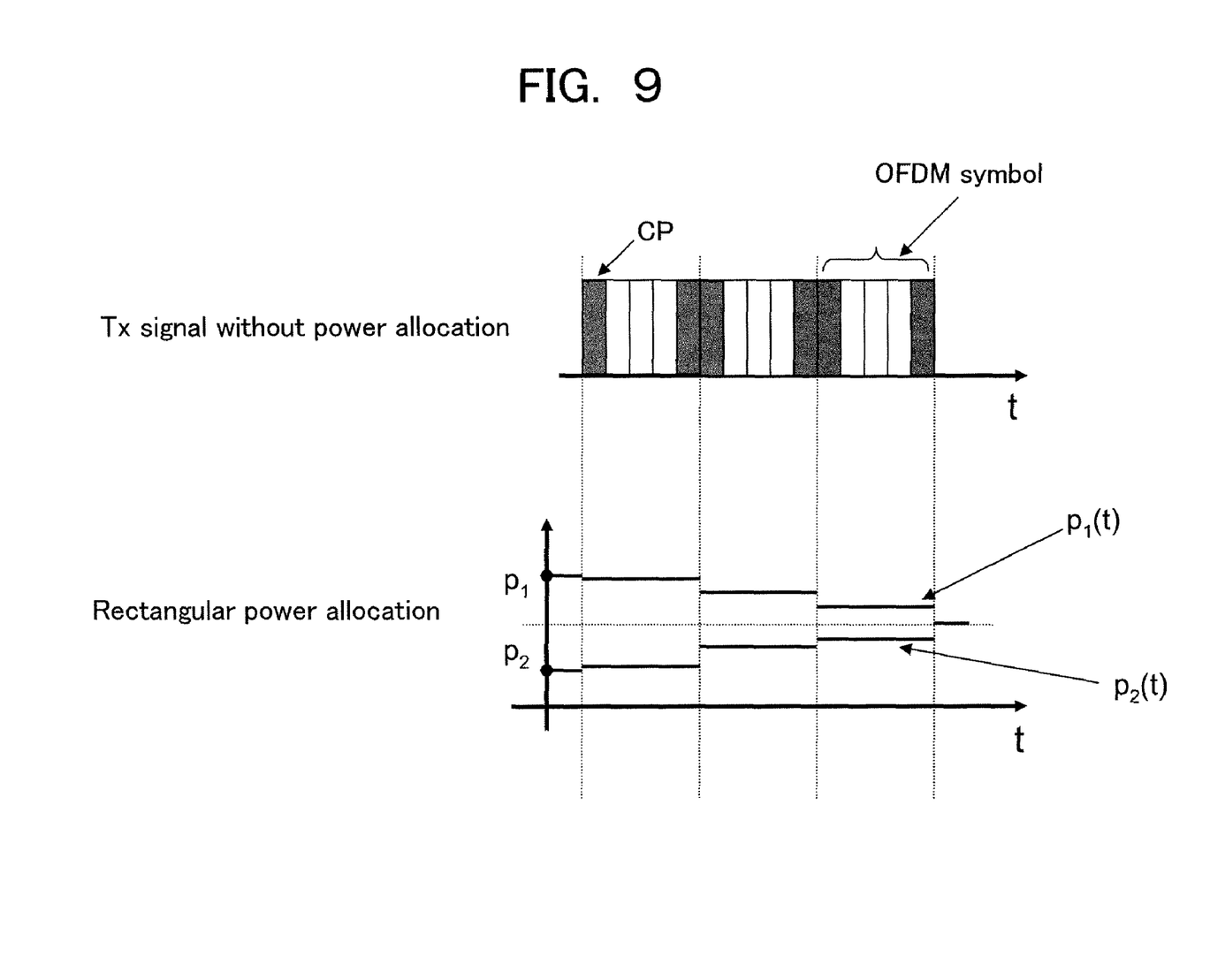
FIG. 9 is a drawing showing a method of changing the power allocation in the case where the OFDM method used in the wireless communication system of the present invention is used.

In [Expression 3], when fdt is equal to 1, P(t) is equal to I. Since the allocated power is normalized by the average power, the total power is N when the number of streams is N. In the actual use of the method of the present invention, when P(t) continuously changes with respect to time t, the speed of the change in the power allocation has to be sufficiently slower than the following time of AGC (automatic gain control) and the channel following time of the receiving system. If the maximum Doppler frequency fd is an extremely large value and significant degradation is caused in received-signal processing when the present method is used, the performance degradation can be prevented by rectangularly changing P. The state thereof is shown in FIG. 8. In FIG. 8, a frame format has the form in which one pilot is inserted per five symbols. In the case where this wireless communication system carries out channel estimation only at the pilots and demodulates the subsequent four data symbols by using the result thereof, channel estimation errors are increased in the symbols of the subsequent stage if P is linearly changed. Therefore, in the case of the application in which this estimation error is not acceptable, the method in which P is rectangularly changed along with the cycle of the pilots is effective. This method in which P is rectangularly changed is particularly effective in the system in which demodulation is carried out in units of block like OFDM (Orthogonal Frequency Division Multiplexing). In OFDM, for example, property performance degradation is caused when the effective channel including transmit weight vectors is changed in the time shorter than the OFDM symbol length, and it is therefore desirable that P is changed in the time cycle that is the integral multiple of the OFDM symbol length. This state is shown in FIG. 9.

Figure 10:
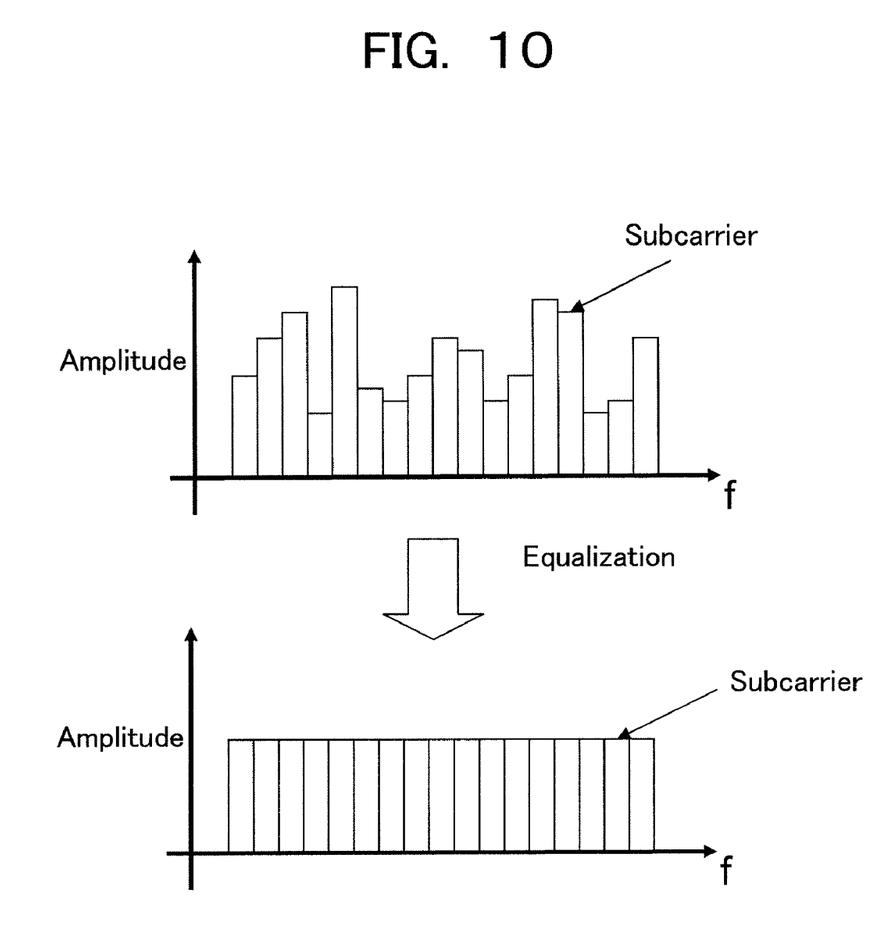
FIG. 10 is a drawing showing equalization in a frequency domain.
Figure 11:
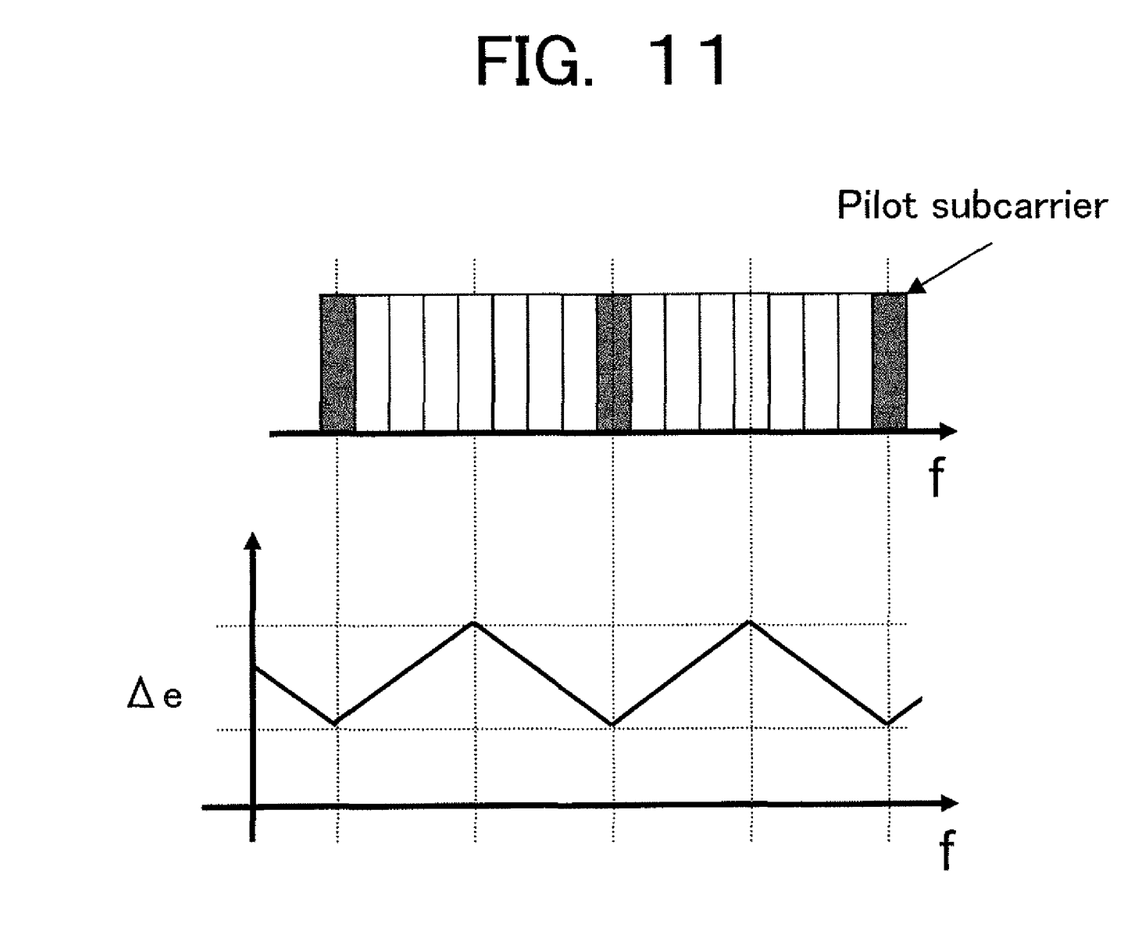
FIG. 11 is a drawing showing the relation between estimated errors and subcarrier layout in the system in which pilots are inserted only to part of subcarriers to estimate channels.
Figure 12:
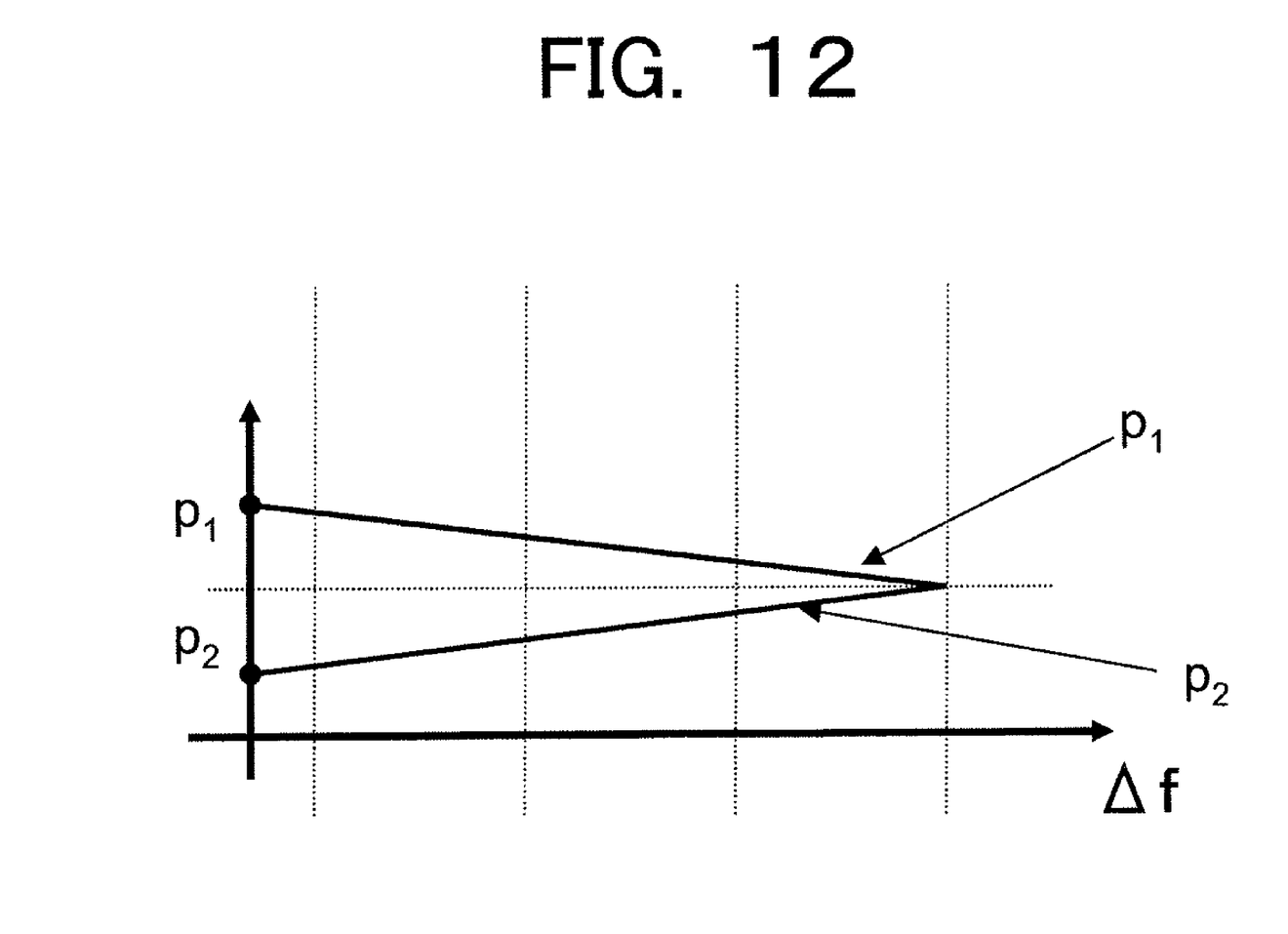
FIG. 12 is a drawing showing the relation between the distance from the pilot subcarrier and power allocation.

Hereinafter, the case where the cause of the gap between H' and H is the variation in frequency domain will be described. With the recent increase in the bandwidth of wireless communication systems, the means to handle the frequency selective fading in the wireless communication systems have become important technologies. The methods to deal with the frequency selective fading include, for example, OFDM which is a multicarrier communication method and frequency domain equalization of a single-carrier communication method. In these methods, equalization is carried out with respect to the symbols in frequency domain. This state is shown in FIG. 10. In this case, the degree of the channel variation in the direction of the frequency axis is characterized by a delay profile showing the arrival time and intensity of delay waves. Generally, the channels of mutually adjacent frequencies have strong correlation to each other, and the channels of mutually distant frequencies statistically have low correlation. The wireless communication system in which equalization is carried out in the frequency domain often uses the method for achieving the simplification of processing and the improvement of data communication efficiency by utilizing the correlation of the adjacent channel frequencies. Hereinafter, sample points of the frequency domain will be referred to as subcarriers like in the case of the multicarrier communication method. For example, the method in which data communication efficiency is improved by sending a pilot signal at a constant subcarrier interval instead of sending pilot signals to all subcarriers is often used. In this case, the channel state information obtained by using the pilot signals is only for a part of the subcarriers, and interpolation is needed to obtain the channel state information for the rest of the subcarriers. In this case, the gap of the estimated channel H' from the new channel H is increased in the subcarriers to which the pilot signals are not sent. Generally, the degree of the gap increases along with the distance Δf from the subcarrier to which the pilot is sent. This state is shown in FIG. 11 and FIG. 12. In FIG. 11, the SNR of each subcarrier is statistically constant. The pilots are inserted in the proportion of one pilot to eight subcarriers. In this case, the degree Δe of the gap between H' and H increases as the distance from the pilot subcarrier increases. Therefore, in the case where power allocation is carried out by using the method of the present invention, the performance degradation of the wireless communication system can be suppressed by equally allocating power with the increase in Δf as shown in FIG. 12. In some wireless communication systems, the channel estimation errors are sometimes increased at the end, center and others of occupied bandwidth other than the distance from the pilot subcarrier. When it is already known that the channel estimation errors are increased at such particular parts, the degradation may be suppressed by causing the power allocation of that part to approach the further equal allocation.

For the estimation of the specific degree of Δe from Δf, for example, the SNR of the subcarrier and the RMS (Root Mean Square) delay spread D obtained from the above-described delay profile can be used. The state thereof is shown by [Expression 4].

$$p_i(\Delta f) = \begin{cases} p_i + \Delta f(1-p_i)/D & (\Delta f/D \le 1) \\ 1 & (\Delta f/D > 1) \end{cases}$$ [Expression 4]

-continued $$\sum_{i=1}^{N} p_i = N$$

In [Expression 4], P is equal to I when Δf/D is equal to 1.

Figure 13:
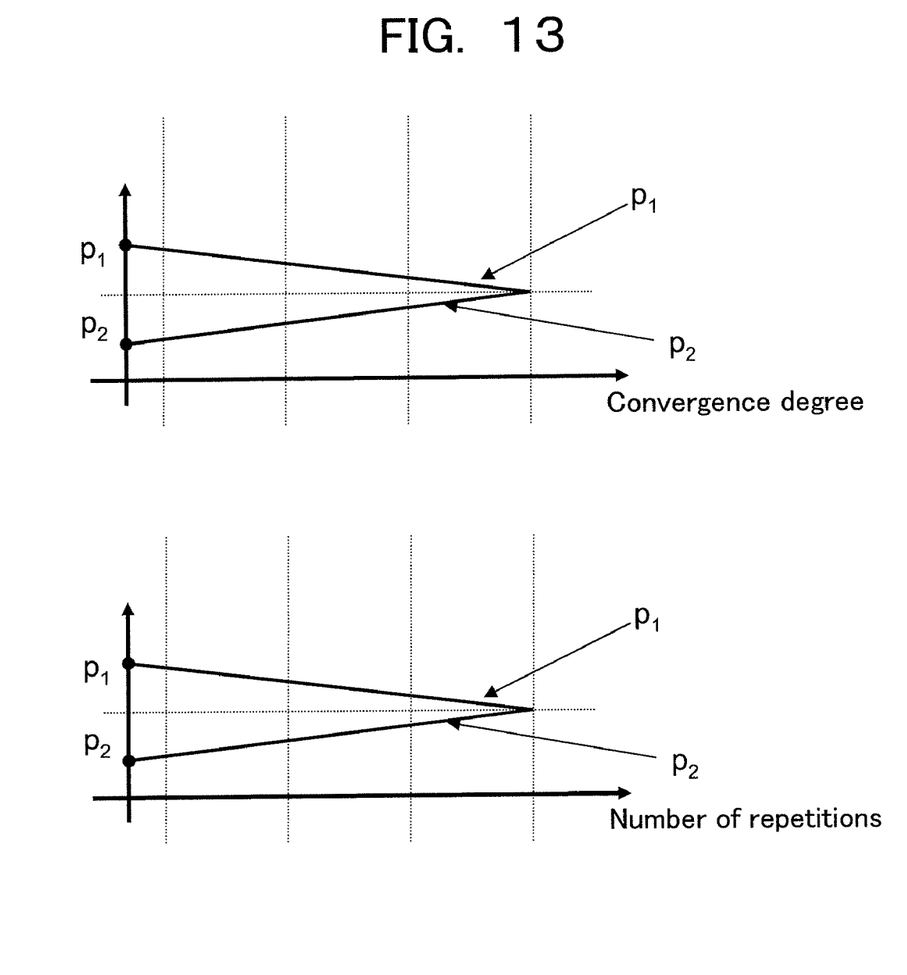
FIG. 13 is a drawing showing a method of changing the power allocation in the system in which the weight vectors are sequentially derived.

Other than that, also in the case where weight vectors are sequentially derived by using the steepest descent method and the conjugate gradient method including LMS (Least Mean Square) and RLS (Recursive Least Square) and in the case where weight vectors are derived by iterative unitary conversion, the performance degradation can be prevented by applying the power allocation method of the present method in accordance with the convergence state and the number of iterations of the weight vectors. The state thereof is shown in FIG. 13.

INDUSTRIAL APPLICABILITY

According to the present invention, in a wireless communication system in which a sending side derives transmit weight vectors based on feedback information and carries out precoding, performance degradation of communication in the case where the channel at the time when weight vectors are derived and the true channel are different can be suppressed.

The invention claimed is:

1. A wireless communication system, comprising:
at least one sending-side wireless transceiver configured to transmit a feedback request, and
at least one receiving-side wireless transceiver configured to receive the feedback request and generate a channel state information to the at least one sending-side transceiver on a feedback loop, wherein
the at least one sending-side wireless transceiver has a function of deriving transmit weight vectors including optimum power allocation for a channel based on the channel state information from the at least one receiving-side wireless transceiver, carrying out the feedback request by using the transmit weight vectors, and estimating a difference between the channel at the time when the transmit weight vectors are derived and an actual channel, and
as the difference between the channel at the time when the transmit weight vectors are derived and the actual channel increases, the power allocation is caused to approach asymptotically to equal allocation from a value at the time when the transmit weight vectors are derived.

2. The wireless communication system according to claim 1, wherein the transmit weight vectors are a matrix using right singular vectors obtained by using singular value decomposition.

3. The wireless communication system according to claim 1, wherein the power allocation is carried out based on any one of a plurality of criteria including water-filling theorem and least BER algorithm.

4. The wireless communication system according to claim 1, wherein the difference between the channel at the time when the transmit weight vectors are derived and the actual channel is a time variation of the channel, and estimating the difference between the channel at the time when the transmit weight vectors are derived and the actual channel is performed based on a time correlation property expressed by using a maximum Doppler frequency.

5. The wireless communication system according to claim 1, wherein causing the power allocation to approach asymptotically to equal allocation from the value at the time when the transmit weight vectors are derived is performed based on an arbitrary function having time as a variable and a maximum Doppler frequency.

6. The wireless communication system according to claim 1, wherein the power allocation is rectangularly changed by an integral multiple of a cycle of a pilot signal transmitted in order for the at least one receiving-side wireless transmitter to follow a variation in a propagation path.

7. The wireless communication system according to claim 1, wherein the power allocation is rectangularly changed by an integral multiple of an OFDM symbol length.

8. A wireless communication method using a wireless communication system in which at least one sending-side wireless transceiver and at least one receiving-side wireless transceiver form a feedback loop and carry out communication with each other, the method comprising:
deriving transmit weight vectors including optimum power allocation for a channel by the at least one sending-side wireless transceiver based on feedback of channel state information from the at least one receiving-side wireless transceiver;
carrying out the communication mutually between the at least one sending-side wireless transceiver and the at least one receiving-side wireless transceiver by using the transmit weight vectors;
estimating a difference between the channel at the time when the transmit weight vectors are derived and an actual channel; and
causing the power allocation to approach asymptotically to equal allocation from a value at the time when the transmit weight vectors are derived as the difference between the channel at the time when the transmit weight vectors are derived and the actual channel increases.

9. The wireless communication method according to claim 8, wherein the transmit weight vectors are a matrix using right singular vectors obtained by using singular value decomposition.

10. The wireless communication method according to claim 8, wherein the power allocation is carried out based on any one of a plurality of criteria including water-filling theorem and least BER algorithm.

11. The wireless communication method according to claim 8, wherein the difference between the channel at the time when the transmit weight vectors are derived and the actual channel is a time variation of the channel, and estimating the difference between the channel at the time when the transmit weight vectors are derived and the actual channel is performed based on a time correlation property expressed by using a maximum Doppler frequency.

12. The wireless communication method according to claim 8, wherein causing the power allocation to approach asymptotically to equal allocation from the value at the time when the transmit weight vectors are derived is performed based on an arbitrary function having time as a variable and a maximum Doppler frequency.

13. The wireless communication method according to claim 8, wherein the power allocation is rectangularly changed by an integral multiple of a cycle of a pilot signal transmitted in order for the at least one receiving-side wireless transceiver to follow a variation in a propagation path.

14. The wireless communication method according to claim 8, wherein the power allocation is rectangularly changed by an integral multiple of an OFDM symbol length.

* * * * *